United States Patent
Chianelli et al.

(10) Patent No.: US 7,425,235 B2
(45) Date of Patent: Sep. 16, 2008

(54) COLOR COMPOSITIONS AND METHODS OF MANUFACTURE

(75) Inventors: Russell Chianelli, El Paso, TX (US); Lori A. Polette, Anthony, NM (US)

(73) Assignee: The Board of Regents of the University of Texas System, Austin, TX (US)

( * ) Notice: Subject to any disclaimer, the term of this patent is extended or adjusted under 35 U.S.C. 154(b) by 0 days.

(21) Appl. No.: 11/351,577

(22) Filed: Feb. 10, 2006

(65) Prior Publication Data

US 2006/0200917 A1    Sep. 14, 2006

Related U.S. Application Data

(60) Provisional application No. 60/652,105, filed on Feb. 11, 2005.

(51) Int. Cl.
C09B 67/00    (2006.01)
C09B 7/00     (2006.01)
C09B 9/04     (2006.01)
C09B 61/00    (2006.01)
C09B 67/28    (2006.01)

(52) U.S. Cl. ............ 106/487; 106/401; 106/498; 8/401; 8/550; 8/552; 8/618; 8/625; 8/632; 8/653; 524/104; 534/15; 548/457

(58) Field of Classification Search ............ 106/401, 106/487, 498; 534/15; 548/457; 8/401, 8/550, 552, 618, 625, 632, 653; 524/104
See application file for complete search history.

(56) References Cited

U.S. PATENT DOCUMENTS

| | | | |
|---|---|---|---|
| 1,058,021 A | 4/1913 | Schmidt | 8/528 |
| 2,940,928 A | 6/1960 | Dupzyk et al. | 508/136 |
| 3,917,556 A | 11/1975 | Baurecht et al. | 260/33.2 |
| 3,950,180 A | 4/1976 | Kato | 106/288 |
| 4,246,036 A | 1/1981 | Anton et al. | 106/99 |
| 4,303,626 A | 12/1981 | Strack et al. | 423/711 |
| 4,303,627 A | 12/1981 | Strack et al. | 423/710 |
| 4,303,628 A | 12/1981 | Strack et al. | 423/710 |
| 4,303,629 A | 12/1981 | Strack et al. | 423/711 |
| 4,305,916 A | 12/1981 | Strack et al. | 423/710 |
| 4,339,419 A | 7/1982 | Strack et al. | 423/710 |
| 4,345,015 A | 8/1982 | Hendriksma et al. | 430/137.18 |
| 4,375,373 A | 3/1983 | Abe et al. | 106/403 |
| 4,396,730 A | 8/1983 | Imahashi | 523/200 |
| 4,405,484 A | 9/1983 | Miyazaki et al. | 510/507 |
| 4,410,364 A | 10/1983 | Finlayson et al. | 106/20 |
| 4,467,061 A | 8/1984 | Yamamoto et al. | 524/87 |
| 4,520,072 A | 5/1985 | Yoshino et al. | 428/403 |
| 4,551,322 A | 11/1985 | Strack et al. | 423/710 |
| 4,585,815 A | 4/1986 | Ono et al. | 524/23 |
| 4,593,007 A | 6/1986 | Novinski | 501/105 |
| 4,640,862 A | 2/1987 | Lakes | 428/308.4 |
| 4,678,652 A | 7/1987 | Tamenori et al. | 423/339 |
| 4,755,368 A | 7/1988 | Ulrich et al. | 423/337 |
| 4,767,433 A | 8/1988 | Lura et al. | 65/21.1 |
| 4,768,987 A | 9/1988 | Usui et al. | 446/71 |
| 4,791,168 A | 12/1988 | Salatin et al. | 524/601 |
| 4,794,147 A | 12/1988 | Savino et al. | 525/440 |
| 4,804,532 A | 2/1989 | Busch, Jr. | 424/69 |
| 4,837,011 A | 6/1989 | Macchio et al. | 424/69 |
| 4,868,018 A | 9/1989 | Schiffer | 428/15 |
| 4,874,433 A | 10/1989 | Kiss et al. | 106/450 |
| 4,936,699 A | 6/1990 | Yoshida | 401/48 |
| 4,954,332 A | 9/1990 | Bissett et al. | 424/59 |
| 4,978,708 A | 12/1990 | Fowler et al. | 524/507 |
| 4,981,759 A | 1/1991 | Nakatani et al. | 428/626 |
| 4,985,479 A | 1/1991 | Nagasaki et al. | 524/96 |
| 4,985,490 A | 1/1991 | Rosthuser et al. | 524/871 |
| 5,049,596 A | 9/1991 | Fujimoto et al. | 523/427 |
| 5,061,290 A | 10/1991 | Koshida et al. | 8/653 |
| 5,083,713 A | 1/1992 | Kanda et al. | 241/30 |
| 5,145,510 A | 9/1992 | Saito et al. | 65/17.2 |
| 5,156,498 A | 10/1992 | Nomura et al. | 406/48 |
| 5,211,733 A | 5/1993 | Fukao et al. | 65/395 |
| 5,306,588 A | 4/1994 | Tanaka et al. | 430/108.3 |
| 5,307,122 A | 4/1994 | Ohno et al. | 399/174 |
| 5,308,808 A | 5/1994 | Gregar et al. | 501/146 |
| 5,376,449 A | 12/1994 | Harris et al. | 428/402 |

(Continued)

FOREIGN PATENT DOCUMENTS

EP    0206800    12/1986

(Continued)

OTHER PUBLICATIONS

"Maya paint secrets revealed," printed from the Accelrys website: www.accelrys.com/cases/maya.html, Mar. 26, 2002.

(Continued)

*Primary Examiner*—Anthony J. Green
(74) *Attorney, Agent, or Firm*—Fulbright & Jaworski LLP

(57) ABSTRACT

The present invention includes a paint or coating composition comprising an organic pigment or dye complexed to the surface of a layered or fibrous inorganic clay. A wide variety of paint colors can be obtained by varying the pH during the preparation as well as by varying the synthesis conditions and changing particle size of the clay.

24 Claims, 4 Drawing Sheets
(4 of 4 Drawing Sheet(s) Filed in Color)

U.S. PATENT DOCUMENTS

| | | | |
|---|---|---|---|
| 5,387,564 A | 2/1995 | Takeuchi et al. | 502/62 |
| 5,395,604 A | 3/1995 | Harris et al. | 423/335 |
| 5,480,696 A | 1/1996 | Harris et al. | 428/69 |
| 5,480,755 A | 1/1996 | Uchiyama et al. | 430/108.7 |
| 5,486,420 A | 1/1996 | Nishihara et al. | 428/405 |
| 5,514,316 A | 5/1996 | Kosugi et al. | 264/86 |
| 5,574,081 A | 11/1996 | Kroon | 524/56 |
| 5,604,163 A | 2/1997 | Endo et al. | 501/12 |
| 5,605,974 A | 2/1997 | Carpenter et al. | 525/452 |
| 5,720,909 A | 2/1998 | Campion et al. | 264/15 |
| 5,807,540 A | 9/1998 | Junino et al. | 424/61 |
| 5,814,140 A | 9/1998 | Reisacher et al. | 106/31.89 |
| 5,840,449 A | 11/1998 | Zambounis et al. | 430/7 |
| 5,880,196 A | 3/1999 | Cho et al. | 524/437 |
| 5,888,587 A | 3/1999 | Campion | 427/452 |
| 5,897,888 A | 4/1999 | Campion et al. | 425/332 |
| 5,942,285 A | 8/1999 | Schmid et al. | 427/318 |
| 5,972,049 A | 10/1999 | Wicker, Jr. et al. | 8/574 |
| RE36,396 E | 11/1999 | Arthur et al. | 428/331 |
| 5,993,920 A | 11/1999 | Kim | 428/15 |
| 6,007,786 A | 12/1999 | Campion et al. | 422/189 |
| 6,033,466 A | 3/2000 | Ito | 106/486 |
| 6,047,568 A | 4/2000 | Campion | 65/395 |
| 6,071,487 A | 6/2000 | Campion et al. | 423/338 |
| 6,071,838 A | 6/2000 | Endo et al. | 501/12 |
| 6,162,646 A | 12/2000 | Webster et al. | 436/166 |
| 6,197,849 B1 | 3/2001 | Zilg et al. | 523/216 |
| 6,200,378 B1 | 3/2001 | Piastra et al. | 106/498 |
| 6,225,245 B1 | 5/2001 | Utsunomiya et al. | 501/54 |
| 6,235,270 B1 | 5/2001 | Ishii et al. | 424/59 |
| 6,252,024 B1 | 6/2001 | Barnard et al. | 526/259 |
| 6,294,012 B1 | 9/2001 | Bindra | 106/496 |
| 6,303,385 B2 | 10/2001 | Barnard et al. | 436/163 |
| 6,323,270 B1 | 11/2001 | Ishida | 524/445 |
| 6,333,013 B1 | 12/2001 | Yoshida et al. | 423/337 |
| 6,339,084 B1 | 1/2002 | Kaul et al. | 514/224.2 |
| 6,346,145 B1 | 2/2002 | Hen et al. | 106/486 |
| 6,357,678 B1 | 3/2002 | Hu et al. | 241/21 |
| 6,386,373 B1 | 5/2002 | Jourdier et al. | 209/11 |
| 6,387,302 B1 | 5/2002 | Konya et al. | 264/15 |
| 6,402,826 B1 | 6/2002 | Yuan et al. | 106/486 |
| 6,555,496 B1 | 4/2003 | Stamires et al. | 502/327 |
| 6,569,922 B2 | 5/2003 | Sugino et al. | 523/443 |
| 6,593,265 B2 | 7/2003 | Stamires et al. | 502/73 |
| 6,689,333 B1 | 2/2004 | Stamires et al. | 423/275 |
| 6,696,034 B2 | 2/2004 | Nozawa et al. | 423/336 |
| 6,710,004 B2 | 3/2004 | Stamires et al. | 502/84 |
| 6,746,524 B1 | 6/2004 | Kitazawa | 106/31.11 |
| 6,749,823 B2 | 6/2004 | Nozawa et al. | 423/337 |
| 6,849,242 B1 | 2/2005 | Koeppler et al. | 423/338 |
| 6,855,751 B2 | 2/2005 | Sugino et al. | 523/443 |
| 7,022,304 B2 | 4/2006 | Stamires et al. | 423/600 |
| 7,052,541 B2 | 5/2006 | Chianelli et al. | 106/401 |
| 2001/0012559 A1 | 8/2001 | Zambounis et al. | 428/304.4 |
| 2004/0011254 A1 | 1/2004 | Chianelli et al. | 106/487 |
| 2006/0200917 A1* | 9/2006 | Chianelli et al. | 8/401 |

FOREIGN PATENT DOCUMENTS

| | | |
|---|---|---|
| EP | 0226453 | 6/1987 |
| EP | 0395006 | 10/1990 |
| EP | 0506034 | 9/1992 |
| EP | 0654711 | 6/1999 |
| EP | 0769535 | 9/2000 |
| GB | 1364675 | 8/1974 |
| GB | 1431636 | 4/1976 |
| JP | 53029939 | 3/1978 |
| JP | 4124174 | 4/1992 |
| JP | 5072771 | 3/1993 |
| JP | 5078593 | 3/1993 |
| JP | 7325415 | 12/1995 |
| JP | 9193544 | 7/1997 |
| JP | 11292744 | 10/1999 |
| WO | WO 89/09804 | 10/1989 |
| WO | WO 92/00355 | 1/1992 |
| WO | WO 92/05225 | 4/1992 |
| WO | WO 00/34379 | 6/2000 |
| WO | WO 01/04216 | 1/2001 |

OTHER PUBLICATIONS

Abagyan and Totrov, "High-throughput docking for lead generation," *Curr. Opin. Chem. Biol.*, 5:375-382, 2001.

Awal, "Studies on the interaction of acid dyes with some local clay minerals," *Journal of Thermal Analysis*, 8:1-5, 1988 (Chemical Abstract No. 113:198787).

Carrado, "Preparation of hectorite clays utilizing organic and organometallic complexes during hydrothermal crystallization," *Industrial and Engineering Chemistry Research*, 31:11654-1658, 1992.

Chianelli and Martinez, "Environmental pigments," printed from the University of Texas at El Paso website: www.mrti.utep.edu/maya.htm, Mar. 26, 2002.

Covington and Franey, "Radiation cured layer of sublimable ink," *IBM Technical Disclosure Bulletin*, 28:3778, 1986.

Fernandez et al., "Experimental and theoretical HREM of palygorskite clays as Maya Blue precursor," *Electron Microscopy*, 3:273-274, 1998, Database Chemical Abstracts Online, Database Accession No. 1998:743496.

Gettens, "Maya blue: an unsolved problem in ancient pigments," *Amer. Antiquity*, 27:557-564, 1962.

Hubbard et al., "Structural study of Maya Blue: Palygorskite-Indigo and Sepiolite-Indigo Adducts," *Clays and Clay Minerals*, 51:318-326, 2003 (Chemical Abstract No. 139:198789).

Josè-Yacamán et al., "Maya Blue Organic / Inorganic Complex Paint: An Ancient Nanostructured Material" *Science*, 273:223-225, 1996.

Kleber et al., "Study and identification of Maya Blue," *Studies in Conservation*, 12:41-56, 1967 (Chemical Abstract No. 68:22756).

Littman, "Maya blue—a new perspective," *Amer. Antiquity*, 45:87-101, 1980.

Littman, "Maya blue—further prespectives and the possible use of indigo as the colorant," *Amer. Antiquity*, 47:404-408, 1982.

Margulies et al., Photostabilization of a nitromethylene heterocycle insecticide on the surface of montmorillonite, *Clays and Clay Minerals*, 36:159-164, 1988.

Peregrin et al., "Synthesis characterization and thermal behavior of some metal indigosulfonates," *Journal of Thermal Analysis*, 29:515-521, 1984 (Chemical Abstract No. 102:71547).

Polette et al., "In-situ identification of palygorskite in Maya blue samples using synchrotron x-ray powder diffraction," *Workshop on Synchrotron Radiation in Art and Archaeology*, SSRL, Oct. 18, 2000.

Polette et al., "Secrets of Maya blue paint," *Discovering Archaelogy*, August, pp. 46-53, 2000.

Rahman et al., "Photocontrolled Binding of Metal Ions with Thioindigo Derivative Containing Oxyethylene Chains," *Bull. Chem. Soc. Jpn*, 66:1461-1465, 1993.

Reinen et al., "The nature and colour centre in 'Maya Blue'—the incorporation of organic pigment molecules into the Palygorskite Lattice," *Z. Anorg. Allg. Chem.* 630:97-103, 2004.

Rytwo, "W-2 Exothermic and Endothermic Adsorption of Organic Dyes to Clay Minerals," *Mediterranean Conference on Calorimetry and Thermal Analysis*, 2005. (Delphion Search result and citation in Greek).

Saliya, "Industrial applications of Maya-type pigments," *Masters Abstract*, Univ. of Texas at El Paso, 43:910, 2004.

Setsune, "Synthesis and application of heteroaromatic compounds with unusual structure and function," *Journal of Synthetic Organic Chem. Jpn*, 46:681-692, 1988.

Shepard, "Maya Blue: Alternative Hypotheses," *Amer. Antiquity*, 27:565-566, 1962.

Tarasevich et al., "Control of the porous structure and absorption properties of carbon-mineral sorbents," *Khimiya I Tekhnologiya Vody*, 9:510-514, 1987, Database Chemical Abstracts Online, Database Accession No. 1988:78127.

Torres, "Maya Blue: How the Mayas Could Have Made the Pigment," *Materials Research Society Symposium* Materials Research Society, pp. 123-128, 1988.

Van Olphen, "Maya blue—a clay, organic pigment," *Science*, 154:645-646, 1966.

Yermiyahu et al., "Monoionic motmorillonites treated with congo-red. Differential thermal analysis study," *Journal of Thermal Analysis and Calorimetry*, 72:413-441, 2003.

Yip et al., "Chemical-vapor-deposited copper on acid-activated bentonite clay as an applicable heterogeneous catalyst for the photo-fenton-like oxidation of textile organic pollutants," *Industrial and Eng. Chem. Res.*, 44:7983-7990, 2005.

Yoko et al., "Photoinduced Electron Transfer Mechanism of Organic Dye in Organic-Inorganic Composite Thin Films," Sinshu Univer., *Text. Sci. and Technol.*, 1999:217, 1999. (abstract only).

Yui and Takagi, "Photochemistry of Laminate Type Organic/Inorganic Hybrid Compounds," *Journal of the Society of Photographic Science and Technology of Japan*, 66:326-340, 2003.

Zeng et al., "Adsorption of Direct Green B on mixed hydroxy-Fe-Al pillared montmorillonite with large basal spacing," *Journal of Environmental Sciences*, 17:159-162, 2005.

\* cited by examiner

COLOR COMPOSITIONS AND METHODS OF MANUFACTURE

This application claims benefit of priority to U.S. Provisional Application Ser. No. 60/652,105, filed Feb. 11, 2005, the entire contents of which are hereby incorporated by reference.

This invention was made with government support under Strategic Metals Grant No. 26-3000-57 awarded by the U.S. General Service Administration. The government has certain rights in the invention.

BACKGROUND OF THE INVENTION

I. Field of the Invention

The present invention relates to the field of paints, pigments, colorants and coatings. More specifically, it provides for novel color compositions and methods of making them.

II. Description of Related Art

In the scientific literature, the term Maya blue refers to a "turquoise" brilliant shade of blue that is found on murals and archaeological artifacts, for example, throughout Mesoamerica. It is described in the literature as being composed of palygorskite clay and indigo, that when mixed and heated, produce the stable brilliant blue color similar to that found in Mesoamerica. Proposed methods of preparation were performed with the intent of trying to replicate the blue color found at the historical sites and to reproduce the techniques employed by the original Maya.

H. Van Olphen, Rutherford Gettens, Edwin Littman, Anna Shepard, and Luis Torres, were perhaps some of the most prominently involved scientists in the examination of organic/inorganic complex paint from the 1960's to the 1980's. In early studies, only Littman and Van Olphen published information specifically on the synthesis of the Mayan organic/inorganic complex (Olphen, 1966a; Olphen, 1996b; Littman, 1980; Littman, 1982). While their work never definitively described the technique for making the colorant, or explained the stability of the organic/inorganic complex, the results of their two decades of studies with respect to the ancient paint laid a foundation of knowledge for future investigators.

Littman has synthesized indigo-attapulgite complexes and verified that his synthetic version was indistinguishable from the original pigments found in the pre-Hispanic murals and artifacts (Littman, 1980; Littman, 1982). The prepared samples had the same physical and chemical characteristics as the authentic Maya blue examined. Littman concluded that the remarkable stability of the attapulgite was due to the heat treatment the attapulgite received during the synthesis. Others have also synthesized compounds similar to that of Maya blue by a number of routes (Torres, 1988). They employed the Gettens test to determine whether the laboratory synthesis of Maya blue was indeed authentic with the same chemical resistant properties (Gettens, 1962). The test was necessary because initial attempts of simply mixing the palygorskite clay produced the color of Maya blue but the mixture did not possess the same chemical properties as the original organic/inorganic complex samples.

The literature for Maya paint compositions does not provide information with respect to varying the color for the paint composition based on altering the pH and particle size; nor does there appear to be mention of using alternate dye or pigment systems as described in the present invention, nor have their been proposed combinations with resins or polymeric systems. The only known literature discussions of pH pertain to the alkaline pH required to reduce the indigo prior to contacting it with the clay (Littman, 1980; Littman, 1982). Furthermore, there is a lack of understanding regarding the chemistry for producing stable and nontoxic paint systems by combining dyes and pigments with fibrous and layered clays.

U.S. Publication No. 2004/0011254 (U.S. Ser. No. 10/370, 288), filed Feb. 18, 2003, describes color compositions comprising indigo derivatives pigments and dyes complexed to the surface of inorganic clays. These materials are useful as paints and coatings for artistic and industrial purposes, including use in cements, plastics, papers and polymers. Upon grinding and heating the organic and inorganic component as solid mixtures or in aqueous solutions, the resulting color compositions have unprecedented stability relative to the original starting material. The inorganic component may be either a layered clay or a fibrous clay, such as palygorskite clay, sepiolite clay, kaolinite clay, bentonite clay, nontronite clay, or mordenite clay. The color properties may be further altered with pH and/or pigment size.

SUMMARY OF THE INVENTION

A method of preparing a composition comprising (a) providing a indigo or molecular derivative thereof indigo; (b) combining said molecular derivative of indigo with a fibrous or layered clay to form a composition; and (c) subjecting the composition to ultraviolet light. The method may further comprise treating the composition with acid. The ultraviolet light may be in the range of about 200 to about 500 nm. The composition may be subjected to ultraviolet light for about 1 minute to about 8 hours. The method may further comprise blending said composition with a polymer or organic binder. The method may also further comprise homogenizing said composition by blending, grinding, milling or stirring.

The composition may further comprise water. The composition may have a pH between 3 and 11. The method may further comprise a step of pH adjustment. The composition may comprises the molecular derivative of indigo in the range of 0.01% to 20% by weight, or in the range of 0.1% to 7% by weight. The composition may comprise the molecular derivative of indigo at about 6% by weight at neutral or acidic pH. The fibrous clay may be a palygorskite clay, a sepiolite clay, or a mixture of a palygorskite and a sepiolite clay. The layered clay may be a kaolinite, bentonite, nontronite, or mordenite clay. The composition may have a particle size between 0.01 µm and 20 µm, or between 0.1 µm and 2 µm. The molecular derivative of indigo may be thioindigo or dibromoindigo. The method may further comprise adding a binding agent to the composition and/or heating the composition. The method may further comprise adding a cement a plastic or a polymer to the composition.

The molecular derivative of indigo may be:

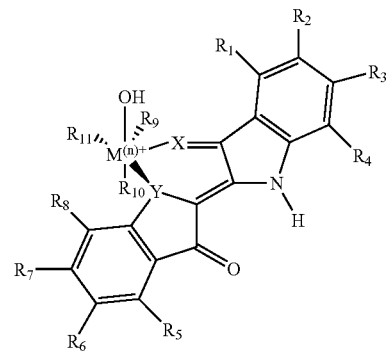

wherein $R_1$-$R_8$ are individually H, $CH_3$, $CH_2CH_3$, F, Cl, Br, I, CN, OH, SH, $OCH_3$ or $OCH_2CH_3$; $R_9$-$R_{11}$ are individually $SiO_3$, SiOH or $H_2O$; Y is N, O, S, or Se; X is O or S; and $M^{(n+)}$ is Al, Sc, Ti, V, Cr, Mn, Fe, Co, Ni, Cu, Pt, Pd or Zn, wherein n is 1, 2, 3 or 4.

The molecular derivative of indigo may be:

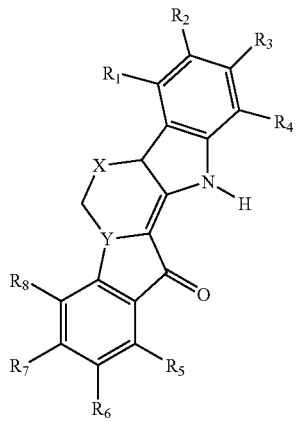

wherein $R_1$-$R_8$ are individually H, $CH_3$, $CH_2CH_3$, F, Cl, Br, I, CN, OH, SH, $OCH_3$ or $OCH_2CH_3$; Y is N, O, S, or Se; and X is O or S.

In another embodiment, there is provided a composition prepared according to a method comprising (a) providing indigo or a molecular derivative thereof; (b) combining said molecular derivative of indigo with a fibrous or layered clay to form a composition; and (c) subjecting said composition to ultraviolet light. The method may further comprise heating of said composition.

In yet another embodiment, there is provided a shapeable molding or tile material made according to the methods described above, wherein said composition further comprises a cement, a plastic or a polymer.

It is contemplated that any method or composition described herein can be implemented with respect to any other method or composition described herein. The use of the word "a" or "an" when used in conjunction with the term "comprising" in the claims and/or the specification may mean "one," but it is also consistent with the meaning of "one or more," "at least one," and "one or more than one." "About" means plus or minus 5% of the stated number.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
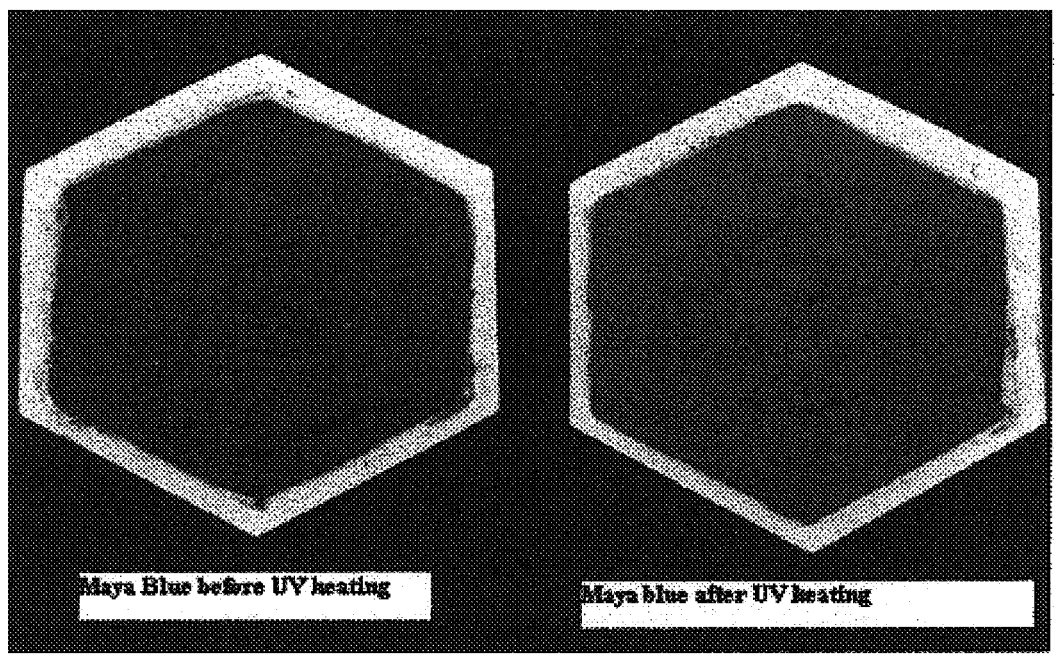
FIG. 1—Maya blue before and after UV heating.

The present invention relates to improved color compositions comprising organic pigments and dyes complexed to inorganic clays. These organic/inorganic hybrid materials are useful as paints and coatings for artistic and industrial purposes, as well as color compositions to be used with cements, plastics, papers and polymers. Upon grinding and treating with UV light, the organic and inorganic elements combine to form a color composition having unprecedented stability relative to the original starting material alone. The inorganic component may be either a layered clay or a fibrous clay. The fibrous clay can be either palygorskite or sepiolite clay. The layered clay may be, for example, a kaolinite, bentonite, nontronite, or mordenite clay. The organic component is an organic dye or pigment of which some examples are found in the book Color Chemistry, $2^{nd}$ ed. (Zollinger, 1991). Using the clay with various dyes or pigments results in achieving a color composition possessing a wide variety of colors.

By altering the pH during the preparation of such color compositions, control of the final color can be attained within any given set of clay/pigment materials. Additionally, by selecting a particular particle size of the clay starting material, a wide range of colors and hues can also be created. The color composition can be suspended in an organic binder, resins or polymers, depending on the final application. The paint powder can also be formulated with a gum arabic; a linseed oil; a copal; a polycarbonate; an egg tempura; or a turpentine, depending on the final application.

The coating composition may be applied to a surface by any of the means known in the art for paint application such as by brushing or spraying. Also, multiple shapeable materials can be formed by incorporating the color composition of the present invention in liquid, powder, or solid form, or as an emulsion with cements, plastics or polymers, to produce molding materials, tiles, concrete and other forms produced using layered or fibrous clays. The color composition can also be incorporated into portland cement concrete materials to be used as color markers on road surfaces or bridges. Some examples of portland cement concrete materials are covered in the *U.S. Department of Transportation Manual* (1990) and other concrete materials are covered in *Concrete* (Mindess and Young, 1981). Methods of incorporating the color compositions into cement or concrete can be found in *Cement Science, In concrete Admixtures Handbook: Properties, Science, and Technology* (Ramachandran and Feldman, 1984).

I. Dyes

The color for the color composition comes from an organic dye or pigment. This chromophore may be indigo or a molecular derivative of indigo such as dibromoindigo or thioindigo. Other derivatives of indigo may also be used to vary the color or other physical properties of the color composition. These chromophores are shown in Schemes 1 and 2. The chromophore may also be a different derivative, such as one containing an additional conjugated ring or ligand.

Scheme 1
Derivative of Indigo

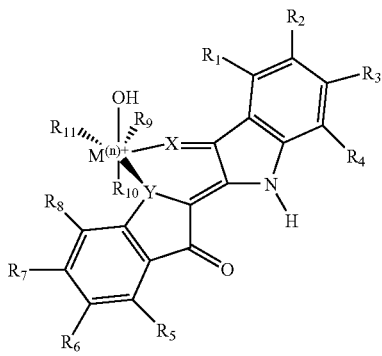

wherein $R_1$-$R_8$ are individually H, $CH_3$, $CH_2CH_3$, F, Cl, Br, I, CN, OH, SH, $OCH_3$ or $OCH_2CH_3$; $R_9$-$R_{11}$ are individually $SiO_3$, SiOH or $H_2O$; Y is N, O, S, or Se; X is O or S; $M^{(n+)}$ is Al, Sc, Ti, V, Cr, Mn, Fe, Co, Ni, Cu, Pt, Pd or Zn; and n is 1, 2, 3, or 4.

Scheme 2
Derivative of Indigo

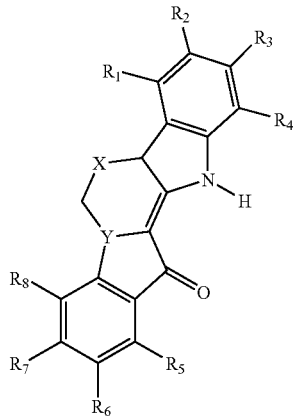

wherein $R_1$-$R_8$ are individually H, $CH_3$, $CH_2CH_3$, F, Cl, Br, I, CN, OH, SH, $OCH_3$ or $OCH_2CH_3$; Y is N, O, S, or Se; X is O or S.

II. Clays

As used herein, the term "clay" refers to layered clays as well as fibrous clay. The fibrous clay is preferentially a palygorskite clay, a sepiolite clay, or a mixture of palygorskite and sepiolite clays. The mixture may be in any ratio. For example, it may be 50% palygorskite and 50% sepiolite, or it may be 10%/90%, 20%/80%, 30%/70%, 40%/60%, 60%/40%, 70%/30%, 80%/20%, or 90%/10% (palygorskite/sepiolite). As used herein the term palygorskite and attapulgity are used interchangeably to refer to the same type of clay. The layered clay may be, for example, a kaolinite, bentonite, nontronite, or mordenite clay.

Previous work has shown that synthesis of comparable organic/inorganic complex paint using clays with plate-like structures, including kaolinite, bentonite, nontronite, and mordenite all produce a blue colored pigment, but without the stability of the indigo derivative/palygorskite complex (Olphen, 1996a; Olphen, 1996b). This indicates that the possible stability of the Maya blue pigment is due to the fiber-like structure of the clays used since the use of plate-like clays had not been shown to yield a stable pigment (Olphen, 1996a; Olphen, 1996b; Littman, 1980; Littman, 1982).

The particle size of the clay may be varied. It is preferentially between 0.01 μm and 20 μm, 0.05 μm and 10 μm or more preferably between 0.1 μm and 2 μm. As the color changes with the size of the particles, varying the particle size allows for greater control of color. Smaller particles will tend to be more blue in hue where the larger particles tend towards green in hue.

III. Polymers, Binding Agents and Modifiers

One or more binding agent or modifiers may be added to the paint composition to increase stability, uniformity, spreadability, adhesion, coating thickness etc. Binding agents and modifiers are well known in the art of paint formulation and may be included in the current coating composition. Binding agents such as solvent-containing binding agents (acryl, cyclized rubber, butyl rubber, hydrocarbon resin, α-methylstyrene-acrylonitrile copolymers, polyester imide, acryl acid butyl esters, polyacrylic acid esters, polyurethanes, aliphatic polyurethanes and chloro sulphonated polyethylene), and thermoplastic materials (polyolefins, α-ethylstyrene-acrylonitrile copolymers, polyester imide and polyamide) may be added to the paint composition. Similarly, polymers such as acrylate, styrene acrylate, acrylonitrile copolymer, polyethylene, polyethylene oxidate, chlorosulfonated polyethylene, ethylene-acrylic acid copolymer, methacrylate, vinylpyrrolidone-vinyl acetate copolymer, vinylidene chloride copolymer, polyvinylpyrrolidone, polyisopropyl acrylate, polyurethane, cyclized rubber, butyl rubber, hydrocarbon resin, α-methylstyrene-acrylonitrile copolymer, polyester imide, acryl acid butyl esters, or polyacrylic acid esters may be added.

The paint composition can be blended with a variety of other medium including gum arabic, linseed oil, copal, polycarbonate, egg tempura, and turpentine to create blended systems. The blended paint color can be altered depending on the medium in which it is blended. Grinding the initial powder to various particle sizes prior to or during blending with a medium can result in color control.

IV. Color Optimization

A series of experiments were developed to optimize the properties and hues of the synthetic versions of organic/inorganic complex. The synthetic versions of organic/inorganic complex were tested for stability using the Gettens test; however, the inventors have found that the Gettens test is limited and alternative methods such as IR have also been employed in these studies. Specifically, by examining the effects of dye or pigment, such as dibromoindigo, concentration, pH, and particle size, a paint possessing a color remarkably similar and stable to that of a known organic/inorganic complex was developed. The stability of the complex can be seen by its resistance to decomposition when exposed to light. Since the complex is formed with both organic and inorganic components, the stability is much higher than if only organic components were used. Based on these studies, a wide range of blues and green hues were developed as well. The present invention has established a synthetic route that can be reproduced based on the instrumental analysis that have established the chemical interactions necessary for a stable reproducible paint. This invention has led to a fundamental understanding of the complex chemical interaction between indigo derivatives and palygorskite or other types of clays.

If one wishes to reproduce a "color" that resembles another color, there are many limitations on how the two could be compared. The concept of color is only accurate if one considers that color does not exist independently of normal color vision. Spectroscopic analyses such as UV/Visible are unavailing considering that certain indigo derivatives are practically insoluble in aqueous acids and aqueous alkaline solutions. Indigo derivatives are soluble in some non-polar solvents but only in the concentration range of $10^{-5}$-$10^{-6}$ mol/L. Heating a mixture of an indigo derivative and palygorskite may indeed produce a color that 'looks' like the organic/inorganic complex seen at so many archaeological sites. But in the absence of knowing the precise quantity, conditions, and binding agents that the Mayans used, the reproductions described in the literature could only be analyzed by an aesthetic visual comparison and represent different chemical techniques for producing a Maya Blue "type" organic/inorganic paint powder.

Early attempts at recreating Maya blue were made by first reducing indigo with sodium hydrosulfite, then contacting it with clay and exposing the mixture to air (Olphen, 1996b). It was also found that heating the paint pigments at moderate temperatures caused the treated pigments to become stable to hot concentrated mineral acids, stable to acetone extraction, and stable to color change when exposed to heat (250° C.) (Olphen, 1996a; Olphen, 1996b). The paint compositions produced in this manner are resistant to decomposition by light. This means that, when exposed to strong sunlight or other light sources as is common for painted surfaces, the composition will not noticeably change in color and the intensity, as measured by IR spectroscopy or x-ray diffraction, and will not decrease more than 10% over a 1 year period. The composition is also resistant to decomposition by acids, alkalis, and solvents. When exposed to acidic or basic solutions, the composition will not noticeably change in color and the intensity, as measured by IR spectroscopy or x-ray diffraction, will not decrease more than 10% over a 1 year period.

V. General Method for Producing Color Composition

The general method for producing a color composition comprises providing a molecular derivative of indigo or any cationic organic dye or cationic pigment. The derivative of indigo can be selected from any indigo derivative shown in Scheme 1. The amount of dye or pigment used can be in the range of 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 2.0%, 3.0%, 4.0%, 5.0%, 6.0%, 7.0%, 8.0%, 9.0%, 10.0%, 11.0%, 12.0%, 13.0%, 14.0%, 15.0%, 16.0%, 17.0%, 18.0%, 19.0%, or 20.0% by weight or more preferably 0.1% to 7% by weight or ideally at about 6% by weight.

The next step comprises combining the molecular derivative of indigo with an appropriate weight of fibrous clay, such as a palygorskite clay, a sepiolite clay, or a mixture of a palygorskite and a sepiolite clay, or a layered clay, such as a kaolinite, bentonite, nontronite, or mordenite clay to form a color composition. This step may further comprises the grinding of the dye or pigment with the layered or fibrous clay which can be carried out in, but not limited to, a blender, industrial blender, industrial mixer, shear blender, or a precise solid state blender. The clay and the dye may be ground separately and then ground together or they may be combined and ground to both mix the two components in order to obtain the preferred particle size. If the clay is already at the preferred size, the clay and indigo may be mixed together without grinding. Techniques for grinding and blending the dye and clay compositions are found in *Mixing of Solids* (Weinekotter and Gericke, 2000), *Powder and Bulk Solids Handling Processes* (Iinoya et al., 1988), or *Bulk Solids Mixing* (Gyenis and Gyenis, 1999). De-ionized water may be added during blending to attain a homogenized mixture. The clay or clay mixture should be ground to obtain particles of between about 0.005 μm and 50 μm, 0.01 μm and 20 μm, 0.05 μm and 10 μm, or more particularly between about 0.1 μm and 2 μm. A range of particles sizes is expected, but over 60% or over 80% or over 90% or over 95% or over 99% of the particles should be the desired size. For example, when the particles are ground to about 2.0 μm, 80% of the particles should be between 1.7 μm and 2.3 μm.

The next step comprises treating the color composition with radiation, including ultraviolet. Light radiation in the range from 10 nm to 500 nm will be used in accordance with the present invention, particularly 200-400 nm (i.e., near UV). Treatment times will vary from very brief—as short as one minute—to several hours (1, 2, 3, 4, 5, 7, 8, 9, 10, 11, 12, 18, 24, 36, 48 or more hours). Suitable devices for providing UV exposure exist including chambers and reactor vessels.

Next the pH of the color composition may be adjusted to an acidic or neutral pH, depending on the final color desired. Exemplary examples of the acid used to adjust the pH comprise: any protonic acid, $H_2SO_4$, $HClO_4$, $HClO_3$, $H_3PO_4$, $HNO_3$, HCN, HF, HBr, HI, $H_3O^+$, or $CH_3COOH$, or more preferably HCl. Exemplary examples of the base used to adjust the pH comprise: LiOH, NaOH, KOH, RbOH, CsOH, $Ca(OH)_2$, $Sr(OH)_2$, $Ba(OH)_2$ or more preferably NaOH. The pH of the color composition can be 1, 2, 3, 4, 5, 6, 7, 8, 9, 10, 11, or 12. The pH of the system can be monitored with a pH meter that is calibrated with buffers of pH 1, 2, 3, 4, 5, 6, 7, 8, 9, 10, 11, or 12.

Additional steps in making the color composition may comprise: treating the color composition with acid such as but not limited to any protonic acid, $H_2SO_4$, $HClO_4$, $HClO_3$, $H_3PO_4$, $HNO_3$, HCN, HF, HBr, HI, $H_3O^+$, or $CH_3COOH$, or more preferably HCl, to remove impurities from the clay; applying the color composition to a surface; blending the color composition with a polymer, plastic or organic binder as discussed in *Encyclopedia of Polymer Science and Engineering*, $2^{nd}$ ed. (Herman, 1990) and *Paint and Surface Coatings: Theory and Practice*, $2^{nd}$ ed. (Lambourne and Strivens, 1999).

The following patents are included as examples to demonstrate certain embodiments of the invention. However, those of skill in the art should, in light of the present disclosure, appreciate that many changes can be made in the specific embodiments which are disclosed and still obtain a like or similar result without departing from the spirit and scope of the invention. U.S. Pat. No. 3,950,180 covers the method of manufacturing color compositions that include zeolite and montmorillonite. U.S. Pat. No. 5,061,290 covers the method of using indigo derivatives as a dyeing agent. U.S. Pat. No. 4,246,036 covers the method of manufacturing color compositions that are comprised of asbestos-cement. U.S. Pat. No. 4,640,862 covers color compositions that are used for coating an expanded polystyrene "drop-out" ceiling tile. U.S. Pat. No. 4,868,018 covers color compositions that are used with a mixture of epoxy resin, epoxy resin hardener, and portland cement to form a coating which can be applied to a surface to form simulated marble products. U.S. Pat. No. 4,874,433 covers a method for encapsulating color compositions in and/or to a zeolite. U.S. Pat. No. 5,574,081 covers a method of manufacturing waterborne clay-containing emulsion paints with improved application performance using color compositions. U.S. Pat. No. 5,972,049 covers the method of manufacturing and using color compositions to form dye carriers used in the dyeing process for hydrophobic textiles. U.S. Pat. No. 5,993,920 covers the method of manufacturing and using color compositions with stone powder and/or cement powder, fine sawdust and/or the heart of a kaoliang stalk and other materials to form an incombustible artificial marble. U.S. Pat. No. 6,339,084 covers the method of manufacturing thiazine-indigo pigments. U.S. Pat. No. 6,402,826 covers the method and manufacturing of color compositions for paper coating.

As used herein, the term "organic/inorganic complex" refers to a complexation of one or more organic molecules with one or more inorganic molecules. As used herein the term "color composition" refers to a pigment or dye complexed to a fibrous or a layered clay. As used herein, the term "coating composition" is synonymous with "color composition" and "paint powder". As used herein, the term "cement" refers to Portland cement types I, II, III, IV, IA, IIA, IIIA or as covered in *The Chemistry of Portland Cement, $2^{nd}$ ed.* (Bogue, 1955); or any cement type discussed in the Dictionary of Cement Manufacture & Technology Zement Woerterbuch (Amerongen, 1986). The chemistry of cements use in the present invention is covered in *The Chemistry of Cements, $2^{nd}$ volume* (Taylor, 1964). As used herein, the term clay refers to a fibrous clay, such as, but not limited to, a palygorskite or a sepiolite clay or a layered clay, such as, but not limited to, kaolinite, bentonite, nontronite, or mordenite clay.

As used herein, the term "about" means within 25% of the stated value, or more preferentially within 15% of the value. As used herein the specification, "a" or "an" may mean one or more. As used herein in the claim(s), when used in conjunction with the word "comprising", the words "a" or "an" may mean one or more than one. As used herein "another" may mean at least a second or more.

VI. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Figure 2:
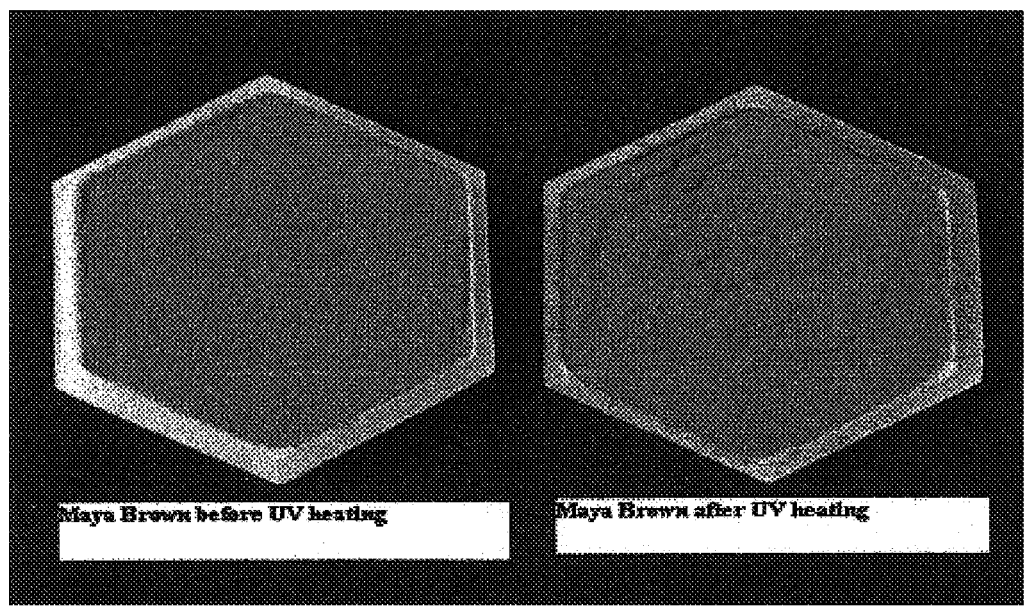
FIG. 2—Maya brown before and after UV heating.
Figure 3:
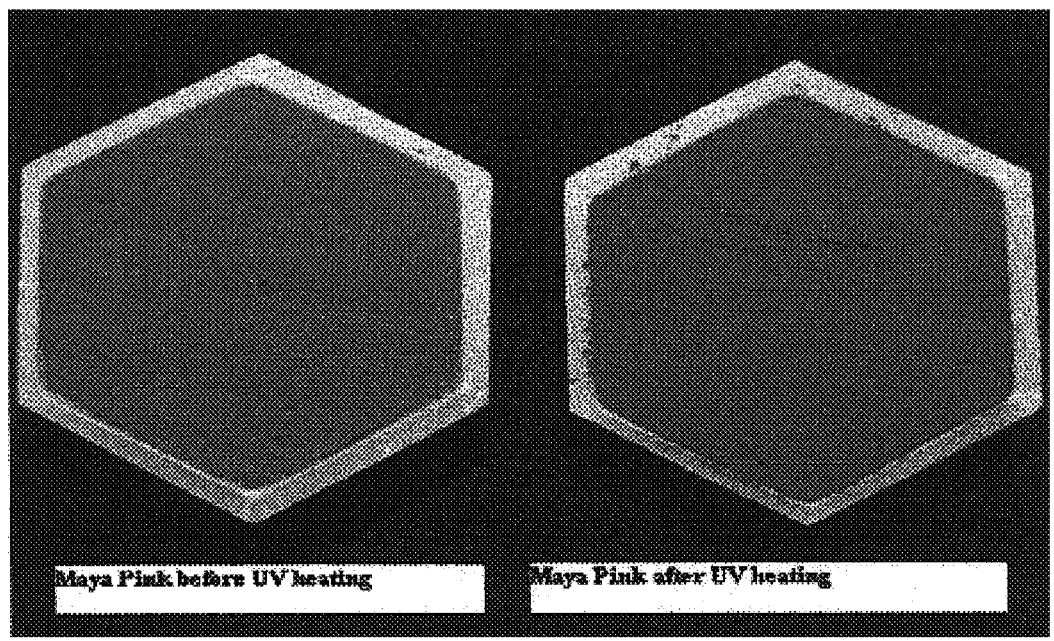
FIG. 3—Maya pink before and after UV heating.
Figure 4:
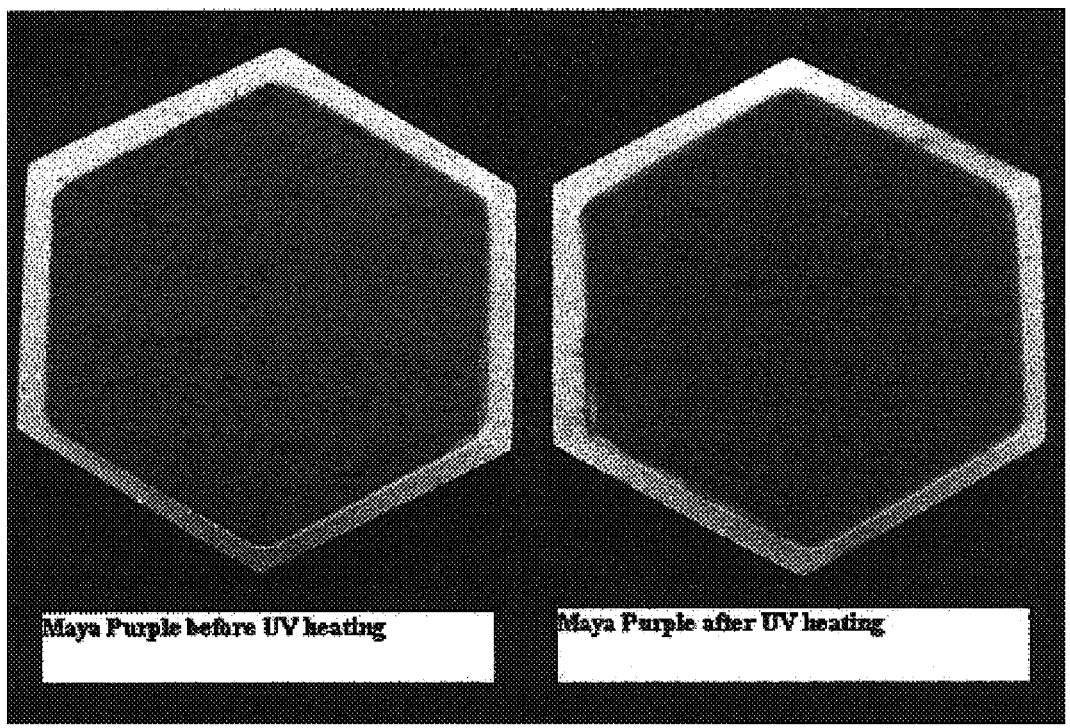
FIG. 4—Maya purple before and after UV heating. The color changes particularly in Maya Purple definitively show that the Maya Blue organic/inorganic complex has been formed.

Palygorskite was mixed with Indigo in the ratio of 95:5%/0.4.5% by wt. This was blended for 5 min followed by ball milling for 24 hrs. The ball-milled mixture was exposed to UV radiation from UVA lamps at 60° C. Color change in the pigment was observed at this point. The color change observed for Maya blue, Maya brown, Maya pink and Maya purple is shown in FIGS. 1, 2, 3 and 4 respectively. The color changes, particularly in Maya Purple, definitively show that the Maya Blue organic/inorganic complex has been formed.

Example 2

The material described in Example 1 was used as a pigment in paint at a pigment content of 11.78% and 38.60% non-volatile matter. The paint was made using a thermoplastic acrylic resin. Xylene was used as a solvent. The paint was applied on a pre-primed Al panel with a 10 mil wet film applicator and allowed to mature for 7 days.

The paints were exposed to QUV for a period of 500 hrs with the QUV cycle set to 8 hrs of UV at 60° C. followed by 4 hrs of condensation at 40° C. A similar procedure was adopted for adopted for Thioindigo, Oralith brilliant pink and Novoperm Red. The products obtained by heating with Indigo, Thioindigo, Oralith Brilliant Pink and Novoperm Red are named as Maya Blue, Maya Purple, Maya Pink and Maya Brown, respectively. The color readings recorded after 500 hrs are shown in Table 1.

TABLE 1

Color Difference Value for Maya blue, Maya purple, Maya Pink and Maya Brown after 500 hrs UV exposure

| Sample | Exposure Time (hrs) | ΔE ± 0.12 |
|---|---|---|
| Maya Blue | 500 hrs | 4.15 |
| Maya Purple | 500 hrs | 2.88 |
| Maya Pink | 500 hrs | 3.02 |
| Maya Brown | 500 hrs | 4.95 |

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference:

U.S. Pat. No. 3,950,180
U.S. Pat. No. 4,246,036
U.S. Pat. No. 4,640,862
U.S. Pat. No. 4,868,018
U.S. Pat. No. 4,874,433
U.S. Pat. No. 5,061,290
U.S. Pat. No. 5,574,081
U.S. Pat. No. 5,972,049
U.S. Pat. No. 5,993,920
U.S. Pat. No. 6,339,084
U.S. Pat. No. 6,402,826
U.S. Pat. No. 7,052,541
U.S. Pub. 2004/0011254
U.S. Ser. No. 10/370,288
Abagyan and Totrov, *Curr. Opin. Chem. Biol.*, 5:375-382, 2001.
Amerongen, In: *Dictionary of Cement Manufacture & Technology Zement Woerterbuch* French & European Pubns., 1986.
Bogue, In: *The Chemistry of Portland Cement*, 2d Ed., NY, Reinhold Publishing Corp, 1955.

Gettens, *Amer. Antiquity,* 27:557-564, 1962.
Gyenis and Gyenis, In: *Bulk Solids Mixing,* Imperial College Press, 1999.
Herman, In: *Encyclopedia of Polymer Science and Engineering,* 2$^{nd}$ Ed., John Wiley & Sons, 1990.
Iinoya et al., In: *Powder and Bulk Solids Handling Processes,* Marcel Dekker, 1988.
Lambourne and Strivens, In: *Paint and Surface Coatings: Theory and Practice,* 2$^{nd}$ Ed., William Andrew, 1999.
Littman, *Amer. Antiquity,* 45:87-101, 1980.
Littman, *Amer. Antiquity,* 47:404-408, 1982.
Mindess and Young, In: *Concrete,* Prentice-Hall, Inc., NJ, 1981.
Olphen, *Amer. Antiquity,* 645-646, 1966b.
Olphen, *Science,* 154:645-646, 1966a.
Ramachandran and Feldman, In: *Cement Science,* Concrete Admixtures Handbook: Properties, Science, and Technology, Noyes Publications, NJ, 1-54, 1984.
Taylor, In: *The Chemistry of Cements,* 2 volumes, London: Academic Press W. F. W., ed. 1964.
Torres, In: *Maya Blue: How the Mayas Could Have Made the Pigment,* Materials Research Society Symposium Materials Research Society, 1988.
U.S. Dept. Transp., Fed. Highway Admin., Portland Cement Concrete Materials Manual Report FHWA-Ed-89-006, Washington, 1990.
Weinekotter and Gericke, In: *Mixing Of Solids* (Powder Technology Series, Number 12), Kluwer Academic Publishers, 2000.
Zollinger, In *Color Chemistry,* 2$^{nd}$ Ed., John Wiley & Son, 1991.

What is claimed:

1. A method of preparing a composition comprising:
(a) providing indigo or molecular derivative thereof;
(b) combining indigo or said molecular derivative of indigo with a fibrous clay to form a composition; and
(c) subjecting said composition to ultraviolet light.

2. The method of claim 1, further comprising treating said composition with acid.

3. The method of claim 1, wherein said ultraviolet light is in the range of about 200 to about 500 nm.

4. The method of claim 1, wherein said composition is subjected to ultraviolet light for about 1 minute to about 8 hours.

5. The method of claim 1, further comprising blending said composition with a polymer or organic binder.

6. The method of claim 1, further comprising homogenizing said composition by blending, grinding, milling or stirring.

7. The method of claim 1, wherein said composition further comprises water.

8. The method of claim 1, wherein said composition has a pH between 3 and 11.

9. The method of claim 1, further comprising a step of pH adjustment.

10. The method of claim 1, wherein said composition comprises said molecular derivative of indigo in the range of 0.01% to 20% by weight.

11. The method of claim 10, wherein said composition comprises said molecular derivative of indigo in the range of 0.1% to 7% by weight.

12. The method of claim 10, wherein said composition comprises said molecular derivative of indigo at about 6% by weight at neutral or acidic pH.

13. The method of claim 1, wherein said fibrous clay is a palygorskite clay, a sepiolite clay, or a mixture of a palygorskite and a sepiolite clay.

14. The method of claim 1, wherein said composition has a particle size between 0.01 μm and 20 μm.

15. The method of claim 14, wherein said particle size is between 0.1 μm and 2 μm.

16. The method of claim 1, wherein said molecular derivative of indigo is thioindigo or dibromoindigo.

17. The method of claim 1, further comprising adding a binding agent to said composition.

18. The method of claim 1, further comprising heating said composition.

19. The method of claim 1, wherein said molecular derivative of indigo is:

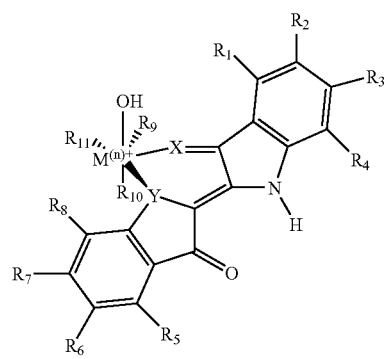

wherein:
$R_1$-$R_8$ are individually H, $CH_3$, $CH_2CH_3$, F, Cl, Br, I, CN, OH, SH, $OCH_3$ or $OCH_2CH_3$;
$R_9$-$R_{11}$ are individually $SiO_3$, SiOH or $H_2O$;
Y is N, O, S, or Se;
X is O or S; and
$M^{(n+)}$ is Al, Sc, Ti, V, Cr, Mn, Fe, Co, Ni, Cu, Pt, Pd or Zn, wherein n is 1, 2, 3 or 4.

20. The method of claim 1, wherein said molecular derivative of indigo is:

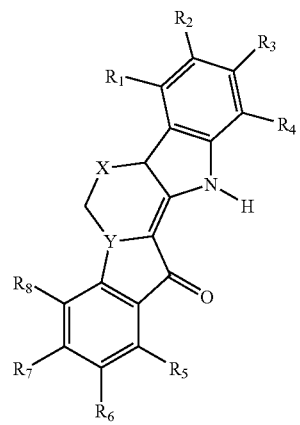

wherein:
$R_1$-$R_8$ are individually H, $CH_3$, $CH_2CH_3$, F, Cl, Br, I, CN, OH, SH, $OCH_3$ or $OCH_2CH_3$;
Y is N, O, S, or Se; and
X is O or S.

21. The method of claim 1, further comprising adding a cement a plastic or a polymer to said composition.

22. A composition prepared according to a method comprising:

(a) providing indigo or a molecular derivative thereof;
(b) combining indigo or said molecular derivative of indigo with a fibrous clay to form a composition; and
(c) subjecting said composition to ultraviolet light.

23. The composition of claim 22, wherein said method further comprises heating of said composition.

24. The composition of claim 22, wherein said composition further comprises a cement, a plastic or a polymer.

* * * * *